United States Patent
Zhou

(10) Patent No.: US 7,952,870 B1
(45) Date of Patent: May 31, 2011

(54) COMPUTER ENCLOSURE

(75) Inventor: Hai-Qing Zhou, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 0 days.

(21) Appl. No.: 12/698,151

(22) Filed: Feb. 2, 2010

(51) Int. Cl.
*H05K 7/20* (2006.01)

(52) U.S. Cl. ......... 361/695; 361/690; 165/122; 454/184

(58) Field of Classification Search .................. None
See application file for complete search history.

(56) References Cited

U.S. PATENT DOCUMENTS

| | | | | |
|---|---|---|---|---|
| 5,793,610 A | * | 8/1998 | Schmitt et al. | 361/695 |
| 5,837,942 A | * | 11/1998 | Becker | 174/138 F |
| 5,969,942 A | * | 10/1999 | Heckner et al. | 361/695 |
| 6,031,717 A | * | 2/2000 | Baddour et al. | 361/679.49 |
| 6,181,557 B1 | * | 1/2001 | Gatti | 361/695 |
| 6,587,340 B2 | * | 7/2003 | Grouell et al. | 361/695 |
| 6,688,965 B1 | * | 2/2004 | Crippen et al. | 454/184 |
| 7,236,361 B2 | * | 6/2007 | Cote et al. | 361/695 |
| 7,345,875 B2 | * | 3/2008 | Elkins | 361/695 |
| 2008/0218969 A1 | * | 9/2008 | Muraki | 361/695 |

* cited by examiner

*Primary Examiner* — Boris L Chervinsky
(74) *Attorney, Agent, or Firm* — Zhigang Ma

(57) ABSTRACT

A computer enclosure includes a casing defining a ventilation hole at one side thereof, a power supply and a cooling fan received in the casing. Heat generated by the power supply is taken out by an airflow generated by the cooling fan to an outside of the casing via the ventilation hole. At least one cover sheet covers the ventilation hole of the casing. One side of the cover sheet is pivotally connected to the casing so that the cover sheet is rotatable with respect to the casing. When the cooling fan works, an airflow produced by the cooling fan flows to the ventilation hole and pushes the cover sheet to rotate with respect to the casing, and thus the ventilation hole is exposed; when the cooling fan ceases to work, the cover sheet falls off due to a weight thereof and the cover sheet fully covers the ventilation hole.

9 Claims, 4 Drawing Sheets

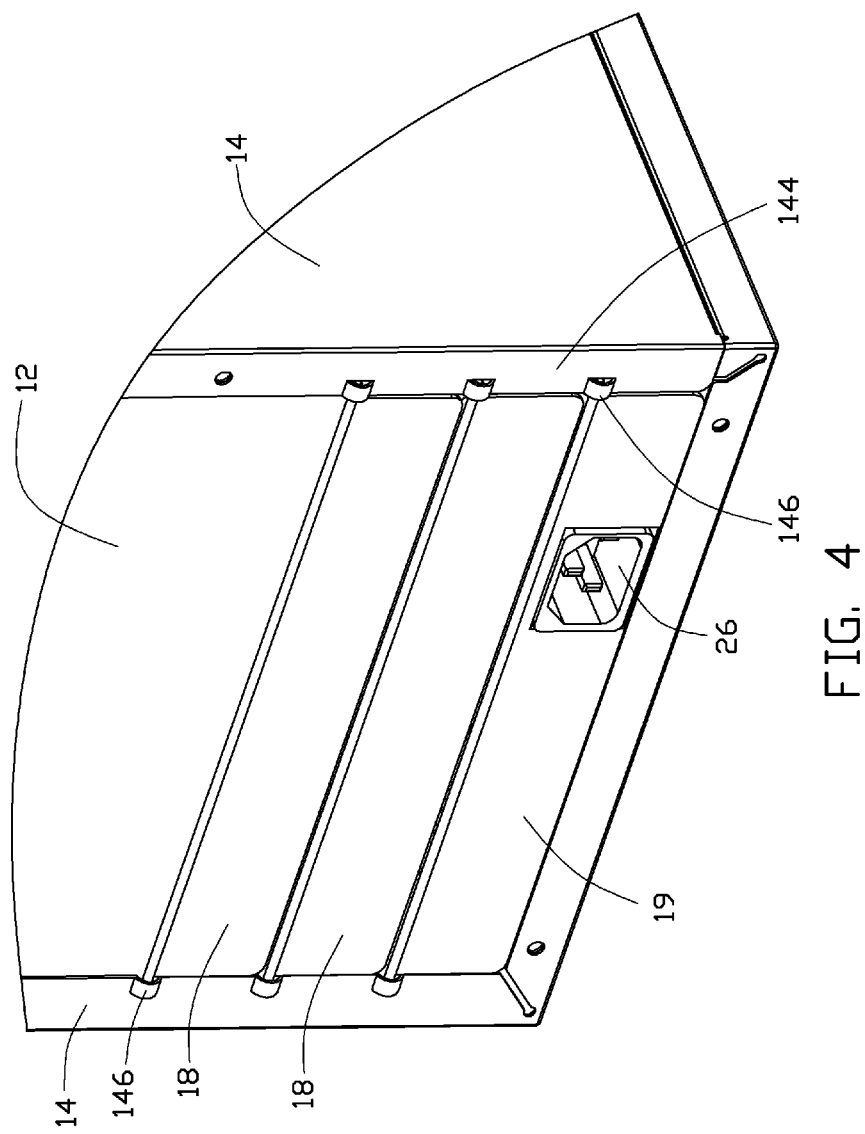

COMPUTER ENCLOSURE

BACKGROUND

1. Technical Field

The present disclosure relates to enclosures, and particularly to a computer enclosure.

2. Description of Related Art

Generally, a power supply has an opening at one side of its housing for dissipating heat from the power module into the computer enclosure. However, insects may enter into the computer enclosure from the ventilation hole, and then enter into the housing of the power supply via the opening, which may result in a short circuit in the power module of the power supply.

Therefore, an improved computer enclosure is desired to overcome the above described shortcoming.

BRIEF DESCRIPTION OF THE DRAWINGS

FIG. 4 is similar to FIG. 3, with the computer enclosure being in another state.

DETAILED DESCRIPTION

Figure 1:
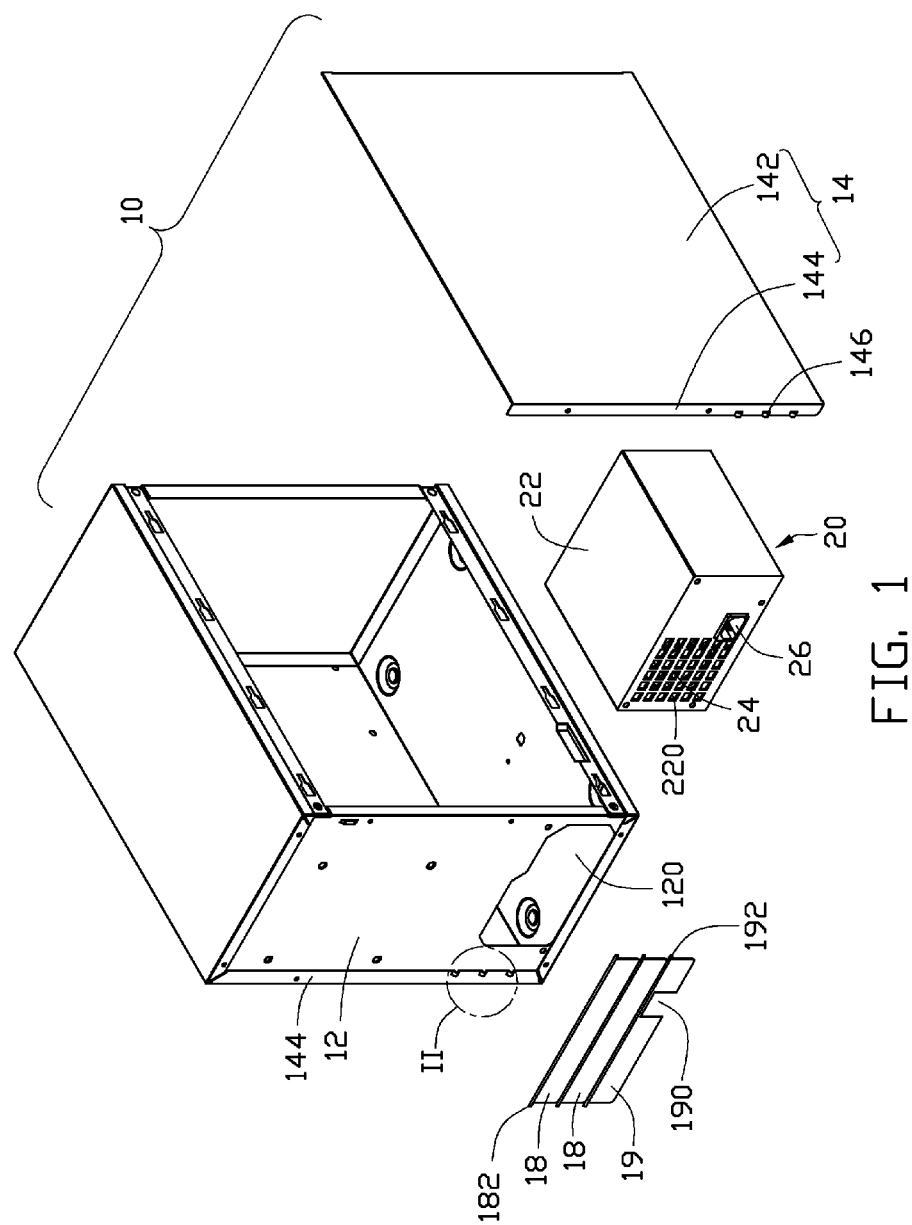
FIG. 1 is an exploded, isometric view of a computer enclosure in accordance with an exemplary embodiment.
Figure 2:
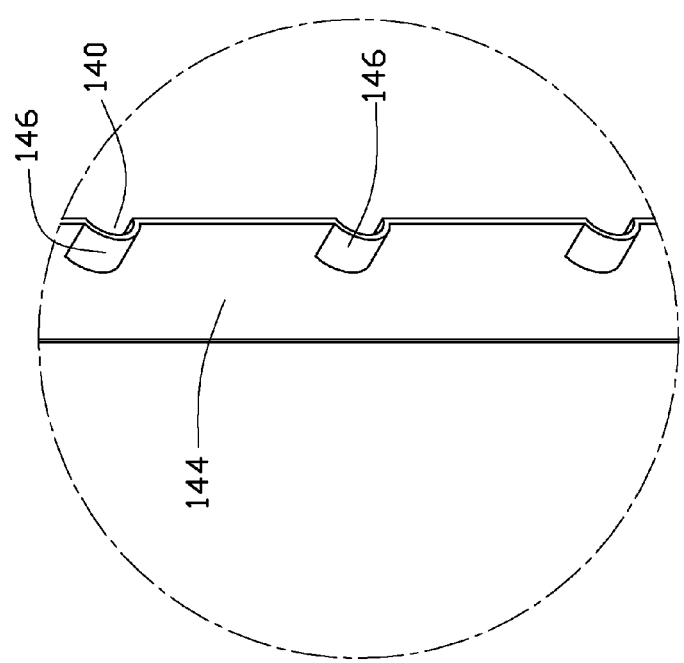
FIG. 2 is an enlarged view of the circle portion II of FIG. 1.

Referring to FIGS. 1 and 2, a computer enclosure includes a casing 10 and a power supply 20 received in the casing 10. The casing 10 includes a back plate 12 and two side plates 14 perpendicularly connected with two opposite sides, i.e., left and right sides of the back plate 12. A ventilation hole 120 is defined in the back plate 12. The side plates 14 each include a rectangular main body 142 and a flange 144 extending perpendicularly from a side of the main body 142. The main bodies 142 of the side plates 14 are perpendicular to the back plate 12, and the flanges 144 of the side plates 14 are attached to and overlap on the left and right sides of the back plate 12. Then, screws (not shown) are provided to protrude through the back plate 12 and the flanges 144 of the side plates 14 to connect the back plate 12 and the side plates 14 together.

Each of the side plates 14 forms three mounting portions 146 on the flange 144. The mounting portions 146 each are curved defining a groove 140. The mounting portions 146 are spaced from each other on each of the side plates 14. The mounting portions 146 on one side plate 14 are aligned with the mounting portions 146 on the other side plate 14 correspondingly. That is, there are two mounting portions 146 arranged on the side plates 14 along a same line to form a pair of mounting portions. The mounting portions 146 cooperatively form three pairs of mounting portions 146. The grooves 140 of each pair of the mounting portions 146 are coaxial with each other.

Two first cover sheets 18 and a second cover sheet 19 are provided for covering on the ventilation hole 120 of the back plate 12. The cover sheets 18, 19 are made of lightweight materials. Each of the first cover sheets 18 and the second cover sheet 19 have an elongated, rectangular profile. The second cover sheet 19 defines a cutout 190 in a bottom side. Each of the cover sheets 18, and 19 forms two shafts 182, and 192 at two opposite ends of a top side correspondingly. The shafts 182, and 192 protrude outwardly towards the mounting portions 146 of the side plates 14 along an extending direction of each of the cover sheet 18, and 19.

The power supply 20 includes a housing 22, a power module (not shown) and a cooling fan 24 received in the housing 22. The housing 22 defines a plurality of holes 220 in one side. An air outlet of the cooling fan 24 is oriented to the holes 220 such that heat can be taken out from the housing 22 via the holes 220. The power supply 20 forms a socket 26 on the housing 22 insertable with a plug (not shown). A size of the socket 26 is substantially the same as the cutout 190 of the second cover sheet 19.

In assembly, the power supply 20 is located in the casing 10 with the holes 220 of the housing 22 aligned with the ventilation hole 120 of the back plate 12. Therefore, heat can be removed easily from the casing 10 via the ventilation hole 120. The cover sheets 18, 19 cooperatively have a size matching the size of the ventilation hole 120, and the cover sheets 18, 19 fittingly cover the ventilation hole 120 in a manner such that the cover sheets 18 cover the top of the ventilation hole 120 and the cover sheet 19 cover the bottom of the ventilation hole 120 of the back plate 12. The second cover sheet 19 is located below the first cover sheets 18. The socket 26 of the power supply 20 is positioned corresponding to the cutout 190 of the second cover sheet 19; thus the socket 26 is exposed from the cutout 190 for a plug of an external power.

The cover sheets 18, 19 are pivotably connected relative to the back plate 12 of the casing 10 with the shafts 182, 192 of the cover sheets 18, 19 received in the grooves 140 of the mounting portions 146, respectively, so that the cover sheets 18, 19 are rotatable relative to the back plate 12 of the casing 10. The three cover sheets 18, 19 are coplanar with each other and coplanar with the back plate 12 in a normal state. When the cover sheets 18, 19 rotate to a certain angle, the ventilation hole 120 becomes exposed. In this case, the angle between the cover sheets 18, 19 and the back plate 12 is smaller than an angle of 90 degrees.

Figure 3:
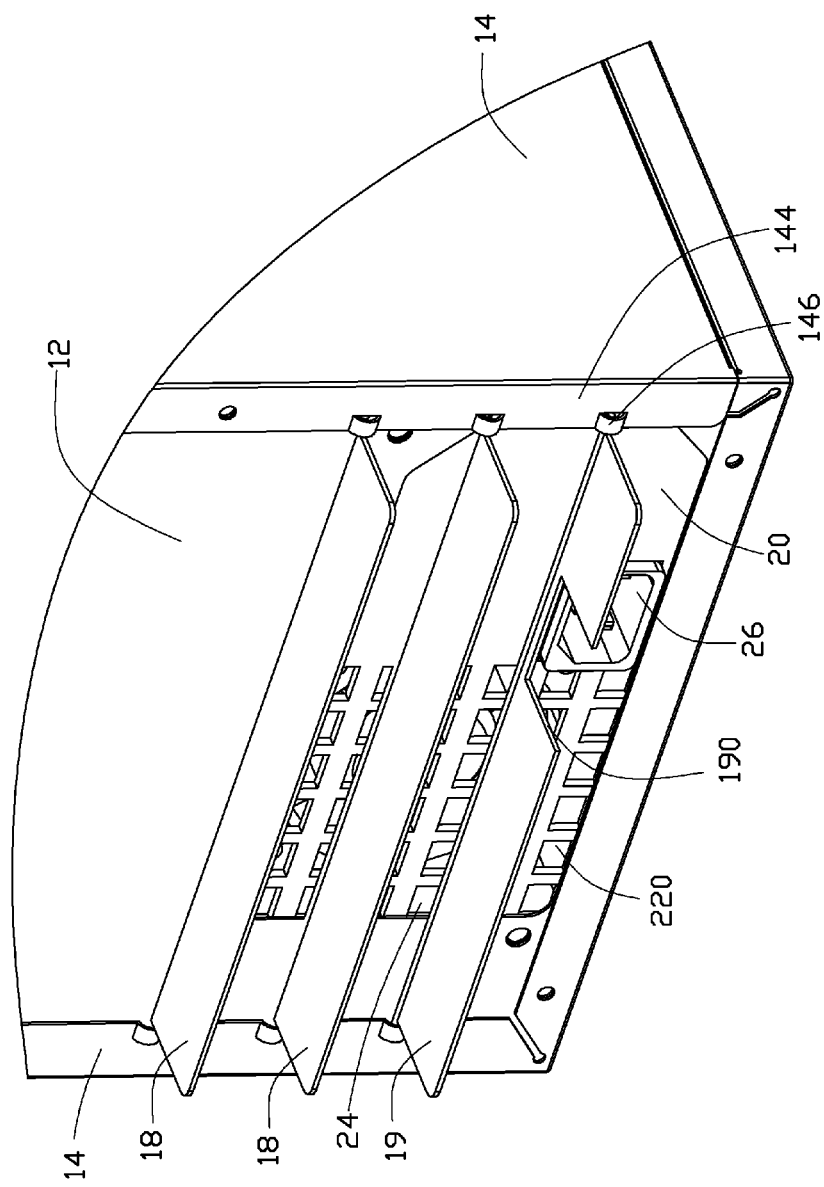
FIG. 3 is an assembled, isometric view of the computer enclosure of FIG. 1, but only a portion of the computer enclosure is shown for clarity.

Referring to FIGS. 3 and 4, when the cooling fan 24 is on, the cooling fan 24 produces airflow to the ventilation hole 120, and the airflow pushes the cover sheet 18, 19 to rotate around the shafts 182, 192 relative to the back plate 12 of the casing 10. Thus, the ventilation hole 120 becomes exposed. When the cooling fan 24 ceases to work, the bottom sides of the cover sheets 18, 19 fall off due to a weight thereof, and then cover on the ventilation hole 120. Therefore, the cover sheets 18, 19 prevent the insects in the outside world from entering into the computer enclosure from the ventilation hole 120.

It is to be understood, however, that even though numerous characteristics and advantages of the disclosure have been set forth in the foregoing description, together with details of the structure and function of the embodiments, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A computer enclosure, comprising:
   a casing defining a ventilation hole at one side thereof;
   a power supply and a cooling fan received in the casing, wherein the power supply comprises a housing in which the cooling fan is received, the housing defining a plurality of holes corresponding to the cooling fan, heat generated by the power supply being taken out by an airflow generated by the cooling fan to an outside of the casing via the ventilation hole; and at least one cover sheet covering the ventilation hole of the casing, one side of the cover sheet being pivotally connected to the casing so that the cover sheet is rotatable with respect to the casing, wherein when the cooling fan works, an airflow produced by the cooling fan flows to the ventilation hole and pushes the at least one cover sheet to rotate with respect to the casing to cause the ventilation hole to be exposed; when the cooling fan ceases to work, the at least one cover sheet falls off due to a weight thereof and the cover sheet covers the ventilation hole.

2. The computer enclosure of claim 1, wherein each of the at least one cover sheet has a rectangular shape with two shafts formed at two opposite ends of a top side of the cover sheet, the casing forms a plurality of mounting portions at two lateral sides of the ventilation hole, and the mounting portions each define a groove therein for pivotally receiving the shafts of the at least one cover sheet.

3. The computer enclosure of claim 2, wherein the mounting portions each are curved.

4. The computer enclosure of claim 2, wherein the casing comprises a back plate and two side plates connected with the back plate, the side plates each comprise a main body perpendicular to the back plate and a flange extending from the main body and attached to the back plate, the mounting portions being formed on the flanges of the side plates.

5. The computer enclosure of claim 1, wherein the power supply forms a socket for accepting an external electrical connection, the at least one cover sheet defining a cutout corresponding to the socket of the power supply for exposing the socket of the power supply.

6. The computer enclosure of claim 1, wherein the cover sheet is made of lightweight materials.

7. The computer enclosure of claim 1, wherein an angle between the at least one cover sheet and the casing is smaller than an angle of 90 degrees after the at least one cover sheet is rotated with respect to the casing.

8. The computer enclosure of claim 5, wherein the at least one cover sheet comprises two or more cover sheets, and the cutout is defined one of the cover sheets.

9. The computer enclosure of claim 1, wherein each of the at least one cover sheet has an elongated, rectangular profile.

* * * * *